United States Patent
Stokes

(10) Patent No.: US 8,475,024 B2
(45) Date of Patent: Jul. 2, 2013

(54) EMERGENCY LIGHTING

(75) Inventor: Peter David Stokes, Norfolk (GB)

(73) Assignee: Saf-T-glo Limited, Swaffham, Norfolk (GB)

(*) Notice: Subject to any disclaimer, the term of this patent is extended or adjusted under 35 U.S.C. 154(b) by 268 days.

(21) Appl. No.: 12/102,404

(22) Filed: Apr. 14, 2008

(65) Prior Publication Data

US 2008/0253139 A1    Oct. 16, 2008

(30) Foreign Application Priority Data

Apr. 14, 2007 (GB) ................................ 0707250.7
Jun. 25, 2007 (GB) ................................ 0712174.2

(51) Int. Cl.
*B60Q 1/26* (2006.01)

(52) U.S. Cl.
USPC ............. 362/542; 362/557; 362/645; 362/34; 362/84

(58) Field of Classification Search
USPC ............... 362/557, 645, 542, 34, 84
See application file for complete search history.

(56) References Cited

U.S. PATENT DOCUMENTS

| 5,499,170 A * | 3/1996 | Gagne .............................. 362/84 |
| 5,724,909 A * | 3/1998 | Pitman et al. .................... 362/84 |
| 5,775,016 A * | 7/1998 | Chien ............................ 362/570 |
| 6,237,266 B1 * | 5/2001 | Tassey et al. .................. 362/153 |

FOREIGN PATENT DOCUMENTS

| EP | 1 783 000 A1 | 5/2007 |
| GB | 2274055 | 7/1994 |
| GB | 2 314 536 | 1/1998 |
| GB | 2 328 064 A | 2/1999 |
| GB | 2 365 113 A | 2/2002 |
| WO | WO 88/06218 | 8/1988 |
| WO | WO 97/12646 | 4/1997 |

* cited by examiner

*Primary Examiner* — William Carter
(74) *Attorney, Agent, or Firm* — Greer, Burns & Crain, Ltd.

(57) ABSTRACT

A photoluminescent track for an emergency lighting system comprises an elongate holder and an elongate photoluminescent insert received in a channel extending lengthwise of the holder. The insert is a push-fit in the channel and is retained by engagement of opposed inwardly directed lips at the mouth of the channel with the upper side edges of the insert so that the upper surface of the insert is exposed within the opening.

15 Claims, 7 Drawing Sheets

EMERGENCY LIGHTING

FIELD

This invention concerns improvements in or relating to emergency lighting and in particular, but not exclusively, emergency lighting used to indicate an escape path leading to an exit for evacuation of a passenger vehicle in an emergency, for example following an accident.

The invention has particular application to passenger vehicles of the type in which rows of seats are provided on either side of an aisle with an exit at one or both ends of the aisle and/or on one or both sides of the aisle between the ends. Examples of this type of passenger vehicle include aircraft, trains and coaches.

BACKGROUND

An emergency lighting system for use in an aircraft is described in our UK Patent No. 2 314 536 in which the path to the exit(s) is illuminated by photoluminescent material incorporated into a track extending along the aisle for passengers to follow to the exit(s). When exposed to a light source, the photoluminescent material is activated and emits light that is visible under conditions of darkness or low illumination from other light sources, for example where smoke from a fire blocks the overhead lights that normally illuminate the passenger cabin. The level of illumination provided by the photoluminescent material is sufficient to guide passengers to an exit to evacuate the aircraft and avoids the problems associated with electrically powered systems that are prone to failure at the time they are required, for example due to damage to the wiring supplying power to the system.

The present invention seeks to provide improvements to the emergency lighting system described in our aforementioned patent.

SUMMARY

According to a first aspect of the invention, we provide a photoluminescent track for an emergency lighting system comprising an elongate holder and an elongate photoluminescent insert, the holder having a channel extending lengthwise of the holder, the channel defining an opening in a surface of the holder that is uppermost in use of the track, wherein the insert is releasably secured in the channel so that a surface of the insert is exposed within the opening.

By this aspect of the invention, the insert can be fitted to and removed from the holder with the track in situ. In this way, a damaged or worn insert can be replaced without removing or replacing the holder.

The insert may be reversible and so that it can be fitted in the channel either way up. For example, the insert may have a centre of symmetry about a plane mid-way between upper and lower main surfaces. In this way, if the exposed surface of the insert is damaged or worn, a repair to the track can be effected by removing and re-fitting the insert the other way up.

According to a second aspect of the invention, we provide a photoluminescent track for an emergency lighting system comprising an elongate holder and an elongate photoluminescent insert, the holder having a channel extending lengthwise of the holder, the channel defining an opening in a surface of the holder that is uppermost in use of the track in which the insert is received, and a groove on at least one side of the holder in which a marginal edge of a floor covering can be received, wherein the holder is operable in response to insertion of the insert in the channel to retain the marginal edge of a floor covering received in the groove.

By this aspect of the invention, the holder grips the marginal edge of a floor covering received in the groove when the insert is fitted in the channel. In this way, the edge of the floor covering is positively held in place without the need for separate grippers.

According to a third aspect of the invention, we provide an emergency lighting system employing a photoluminescent track according to the first or second aspects of the invention.

The emergency lighting system may comprise a pair of tracks spaced apart to define therebetween an escape path leading to an exit.

According to a fourth aspect of the invention, we provide a passenger vehicle provided with an emergency lighting system according to the third aspect of the invention.

The vehicle may be any of an aircraft, train, coach or ship.

The vehicle may comprise a single deck or several decks connected by stairs. Where the vehicle comprises more than one deck, the emergency lighting is preferably provided on each deck and on the stairs between the decks so as to assist movement up and down the stairs between the decks.

According to a fifth aspect of the invention, we provide a photoluminescent track for an emergency lighting system comprising an elongate casing and an elongate photoluminescent member housed within the casing, wherein the track has a low profile and is flexible in the direction of its length.

By this aspect of the invention, the low profile of the track provides a minimum hazard when the track is fitted to the floor and the flexibility in the direction of the length of the track enables the track to be preformed in lengths of several metres and wound into a roll for storage from which any desired length of track can be cut.

The aspects of the invention will now be described in more detail by way of example only with reference to the accompanying drawings.

DETAILED DESCRIPTION OF THE EXEMPLARY EMBODIMENTS

Figure 1:
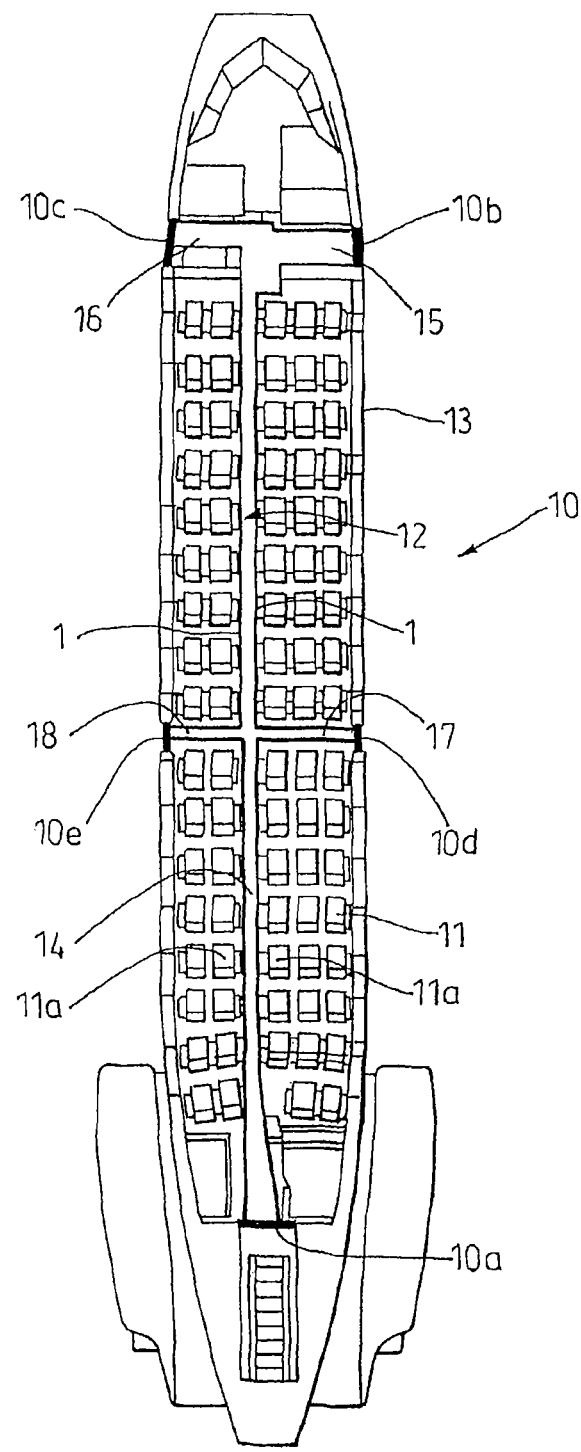
FIG. 1 shows a general arrangement of a photoluminescent emergency lighting system in an aircraft.

With reference first to FIG. 1, there is shown the general layout of a photoluminescent emergency lighting system 1 in an aircraft. The aircraft has a passenger cabin 13 with a plurality of rows of seats 11 disposed on either side of a main aisle 12 that extends the length of the passenger cabin 13 to an exit 10a at the back of the cabin 13. Exit aisles 15,16 extend from the main aisle 12 to a pair of exits 10b, 10c on opposite sides of the main aisle 12 at the front of the cabin 13. Exit aisles 17,18 extend from the main aisle 12 to a pair of exits 10d,10e on opposite sides of the main aisle 12 approximately mid-way between the ends of the cabin 13. The exits 10a, 10b, 10c are employed for passengers to get on and off the aircraft both in normal use and in an emergency. The exits 10d, 10e typically open over the wings (not shown) of the aircraft and are only used in an emergency. The emergency lighting 1 is positioned on the floor along each side of the main aisle 12 adjacent to the aisle seats 11a and along each side of the exit aisles 15,16,17,18. In this way, the emergency lighting defines the main aisle 12 and exit aisles 15,16,17,18 that form an escape route from any row of seats 11 in the cabin 13 to the exits 10a,10b,10c,10d,10e.

Figure 2:
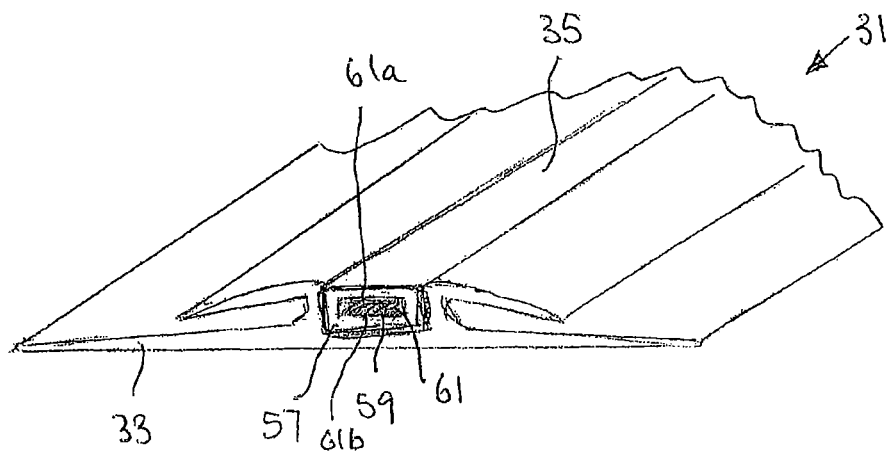
FIG. 2 is a perspective view, from one end of a photoluminescent track according to an embodiment of the invention.
Figure 3:
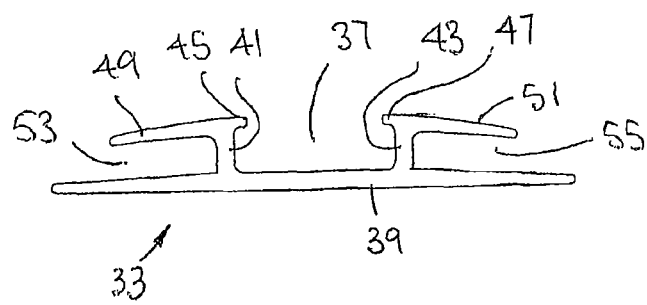
FIG. 3 is a sectional view of the base part of the track shown in FIG. 2.

Referring now to FIGS. 2 and 3 of the drawings, the emergency lighting 1 is shown in more detail and comprises an elongate track 31 having a holder 33 of uniform cross-section and an insert 35 of uniform cross-section detachably mounted in an upwardly open channel 37 of the holder 33.

The holder 33 is an extrusion of one or more plastics such as a blend of polycarbonate and acrylonitrile butadiene styrene (ABS) although it will be understood that other materials may be employed. The holder 33 has a base wall 39 and a pair of longitudinally extending sidewalls 41,43 upstanding from the base wall 39 and inset from the lateral edges to define therewith the channel 37. The sidewalls 41,43 terminate at the upper end in inwardly directed lips 45,47 and outwardly directed flanges 49,51 contiguous with the lips 45,47.

The insert 35 and channel 37 are of substantially matching rectangular cross-section and the insert 35 is releasably secured in the channel 37 by the lips 45,47 that locate over the upper side edges of the insert 35. The holder 33 and insert 35 are configured so that the track has a substantially continuous upper surface with little or no gaps in which liquids or solids can become trapped. It will be understood that the insert 35 and channel 37 may have matching cross-sections other than rectangular and be configured to secure releasably the insert 35 in the channel 37 by any suitable means, for example a snap fit, interference fit, friction fit, mechanical interlock. In some case it may not be necessary for the insert 35 and channel 37 to have matching cross-sections although it is preferred that the insert 35 and channel 37 are configured so that the track presents a substantially continuous upper surface, i.e. with no gaps to trap dirt or liquid.

The flanges 49,51 are spaced above the base wall 39 and define with the base wall 39 and sidewalls 41,43 a pair of elongate grooves 53,55 that are open on both sides of the holder 33. In use, the grooves 53,55 receive and conceal the marginal edge of floor covering such as carpet laid on the floor of the passenger cabin 13. In this way, the cut edge of the floor covering is not visible and does not present a hazard for people to trip over. The holder 33 and in particular the flanges 49,51 of the holder 33 may be colored to match the color of the carpet so that visual impact of the emergency lighting under normal conditions when the lighting is not required is reduced. This is not essential however and the holder 33 may be of any color.

The insert 35 comprises an elongate casing 57 of rectangular cross-section having a central slot 59 of rectangular cross-section and an elongate photoluminescent member 61 received in the slot 59. The casing 57 is an extrusion of one or more light transmitting plastics such as polycarbonate although it will be understood that other materials may be employed. The photoluminescent member 61 extends the length of the slot 59 and is secured within the slot 59 by attaching end caps (not shown) to the end faces of the casing 57 around the perimeter of the slot 59 with adhesive or other suitable means to seal the slot 59 and prevent ingress of liquids or dirt into the slot 59.

The photoluminescent member 61 is provided with photoluminescent material such as doped strontium aluminate or zinc sulphide that is activated (excited) by exposure to daylight or an artificial light source within the cabin 13 and emits light that is visible in conditions of low illumination from any other light source within the cabin such as in darkness at night when the normal cabin lighting is switched off or when smoke from a fire blocks the light from any other light source within the cabin. In this embodiment, the photoluminescent material is provided on both faces 61a,61b of the photoluminescent member 61 and the insert 35 can be fitted in the channel 37 of the holder 33 with either one of the faces 61a,61b uppermost. In this way, if the upper surface of the insert 35 is damaged or becomes worn (scratched or scuffed) in use of the track, a repair can be effected by removing the insert 35 from the holder 33 and re-fitting it the other way up within the channel 37 in the holder 33 so that the damaged or worn face of the insert 35 is facing down and the other, undamaged face of the insert 35 is facing up. This enables the track 1 to be repaired in situ by reversing the orientation of the insert 35. As a result, the life of the track 31 can be extended and a repair carried out using the existing parts of the track 31. This is of particular benefit if a repair is required and there is no stock of spare inserts available to replace the damaged insert 35. The outer surface of the insert 35 and exposed surface of the holder 33 may be coated with an acrylic lacquer or other suitable material to improve abrasion resistance.

The track 31 preferably comprises a plurality of sections of pre-formed length, for example 1 or 2 meter lengths, laid end to end or at right angles to each other on the floor of the cabin 13. A section can also be cut into a shorter length to enable the track 31 to be adapted to suit the layout of the seats and exits in a particular aircraft. Each section has the insert 35 extending from one end to the other end so that, when sections are laid end to end or at right angles, the light emitted by the photoluminescent members 61 is substantially unbroken along the length of the track 31 and provides a continuous cue from any point of the main aisle 12 and exit aisles 15,16,17,18 to an exit.

The track 31 may incorporate markings (not shown) to provide information or instructions to assist evacuation of the aircraft in an emergency. For example to indicate where the exit aisles 15,16,17,18 lead from the main aisle 112 to the exits 10b,10c,10d,10e. The markings may be applied to the photoluminescent member 61 and encapsulated within the insert 35 during manufacture. The markings may be in the form of symbols such as arrows, chevrons or the like. Alternatively or additionally, the markings may include words such as 'exit' or the like to reinforce the message provided by the symbols. The markings may change the color of the light emitted by the photoluminescent member 61 so as to appear a different color to the rest of the photoluminescent member 61. Alternatively, the markings may block the light emitted by the photoluminescent member 61 so as to appear dark against an illuminated background. The track 31 may incorporate a light transmitting colored film positioned over the photoluminescent member 61 within the slot 59. The color of the film may be chosen to match the color of the holder 33 and/or adjacent floor covering to further reduce the visual impact of the track 31 when the emergency lighting is not required and without affecting the light output level of the photoluminescent member 61 in an emergency.

As will be appreciated, the removable insert 35 allows repairs to be made to the track by removing and replacing or re-fitting a worn or damaged insert the other way up with the holder in situ. The removable insert 35 also allows any markings on the track to be readily altered according to requirements by fitting inserts with different forms of markings or no markings as required. For example, where the markings include words, inserts having the markings in different languages may be selectively fitted according to the country in which the aircraft is used.

Figure 4:
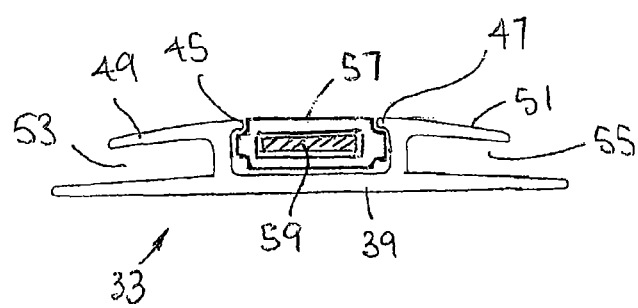
FIG. 4 shows a modification of the track shown in FIGS. 2 and 3.

FIG. 4 shows an arrangement in which the side edges of the casing 57 are rebated to receive the lips 45,47 so that the insert 35 is positively retained in the channel 37 with a substantially flush fit and the upper surface of the track is preferably smooth with no steps or large gaps in which dirt or liquid may be trapped. As shown the side edges are rebated on both upper and lower faces of the casing so that the insert 35 can be fitted either way up and is preferably symmetrical about a centre plane between the faces. It will be understood, however that rebates may be provided on one face only if the insert 35 is not intended to be reversible.

Figure 5:
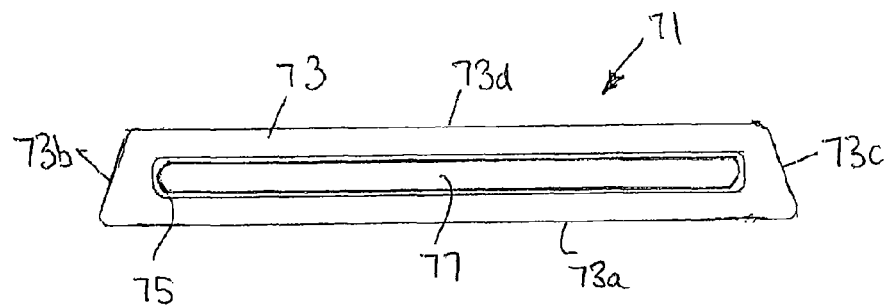
FIG. 5 is a sectional view of a photoluminescent track according to another embodiment of the invention.

Referring now to FIG. 5, there is shown an alternative photoluminescent track 71 for use as emergency lighting in areas of the aircraft where there is no carpet and the floor has a substantially flat upper surface such as may be provided in the galley of an aircraft. The track 71 comprises a casing 73 having a longitudinally extending slot 75 in which a photoluminescent member 77 is located and retained by closing the ends of the slot 75, for example with adhesive or any other suitable means. The track 71 has a flat base wall 73a that is attached directly to the floor, for example by adhesive or other suitable means, and has a low profile for presenting a minimum hazard to people, trolleys or the like. The sidewalls 73b,73c of the casing 73 are angled to assist passage of trolleys. In this embodiment, the casing 73 is an extrusion of one or more light transmitting plastics such as polycarbonate and has a height of 2.4 mm and a maximum width of 17.9 mm. These dimensions are given by way of example only and are not limiting on the scope of the invention. The track 71 can be pre-formed in lengths of several meters that are sufficiently flexible to allow the track 71 to be wound and stored in rolls from which any required length can be cut for installation of the track. External surfaces of the casing 73 may be coated with a polyacrylic lacquer or other suitable material that improves abrasion resistance. In this embodiment, the track 71 is not intended to be reversed and the photoluminescent member 77 is provided with photoluminescent material on one side only, the side that is uppermost in use and covered by the top wall 73d of the casing. The track 71 may incorporate markings applied to the photoluminescent member 77 as described previously to provide information or instructions to assist evacuation of the aircraft in an emergency. The track 71 may incorporate a colored film placed over the photoluminescent member 77 within the slot 75 as described previously to match the color of the track 71 to the adjacent flooring. Although the track 71 has been described for floor mounted emergency lighting, it will be understood that the low profile makes the track suitable for use as emergency lighting in other positions. For example, the track could be attached to the sides of the aisle seats or to overhead lockers.

Referring now to FIGS. 6 to 11, another embodiment according to the invention is shown in which like reference numerals in the series 100 are used to indicate parts corresponding to the embodiment of FIGS. 2 and 3.

The track 131 comprises a holder 133 and photoluminescent insert 135 detachably located and retained in channel 137 of the holder 133. The holder 133 and insert 135 are of uniform cross-section and are made of similar materials to the previously described embodiment of FIGS. 2 and 3.

Figure 6:
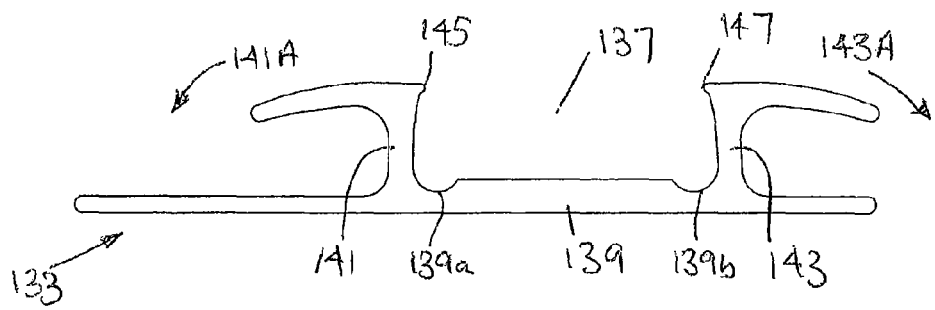
FIG. 6 is a cross-section of a modified holder for a photoluminescent track embodying the invention.

As best shown in FIG. 6, the channel 137 has sidewalls 141,143 that converge from the base wall 139 towards the mouth of the channel 137. The mouth of the channel 137 is narrower than the insert 135 and the sidewalls 141,143 can pivot to open the mouth as shown by the arrows 141A, 143A when the insert 135 is fitted. To assist this pivotal movement, the holder 157 preferably has longitudinal grooves 139a,139b formed in the base wall 139 adjacent to the sidewalls 141,143. This arrangement has a number of benefits.

Figure 7:
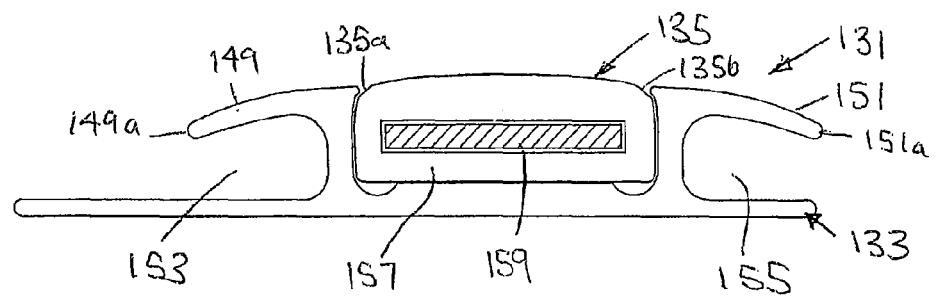
FIG. 7 is a cross-section of the modified holder of FIG. 6 with the insert fitted.

Firstly the insert 135 is gripped between the sidewalls 141,143 and the lips 145,147 are urged to locate in longitudinal rebated edge portions 135a,135b of the insert 135 to retain the insert 135 in position due to the resilience of the sidewalls 141,143 as shown in FIG. 7. As a result, the insert 135 can be firmly located and held in position within the channel 137 eliminating any free-play or rattling without the need to use any additional means to secure the insert 135 such as adhesive tape. As shown the upper face of the insert is curved to match the curvature of the flanges 149,151. This is not essential and the upper face may be flat.

In FIG. 7 the insert has rebated edge portions on one face only. It will be understood, however that the insert may be provided with rebated edge portions on both faces allowing the insert 135 to be fitted either way up as shown in FIG. 4 and is preferably symmetrical about a centre plane between the faces. In this way, the insert can be easily removed and refitted the other way up with the holder in situ to present a clean, unscratched surface uppermost without having to remove any adhesive from the lower surface. As a result, the service life of the track can be increased and the track can be repaired in situ without the need for any spare parts.

Figure 8:
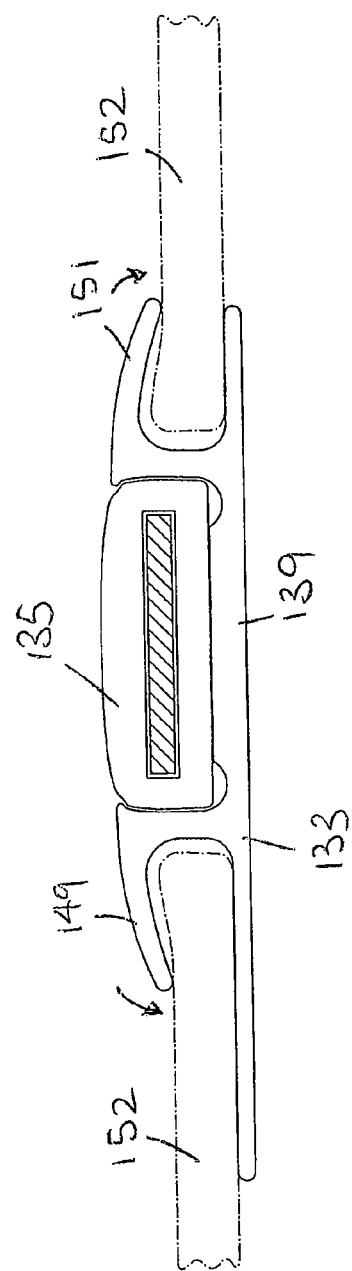
FIG. 8 is a cross-section similar to FIG. 7 showing a floor covering secured in the grooves.
Figure 9:
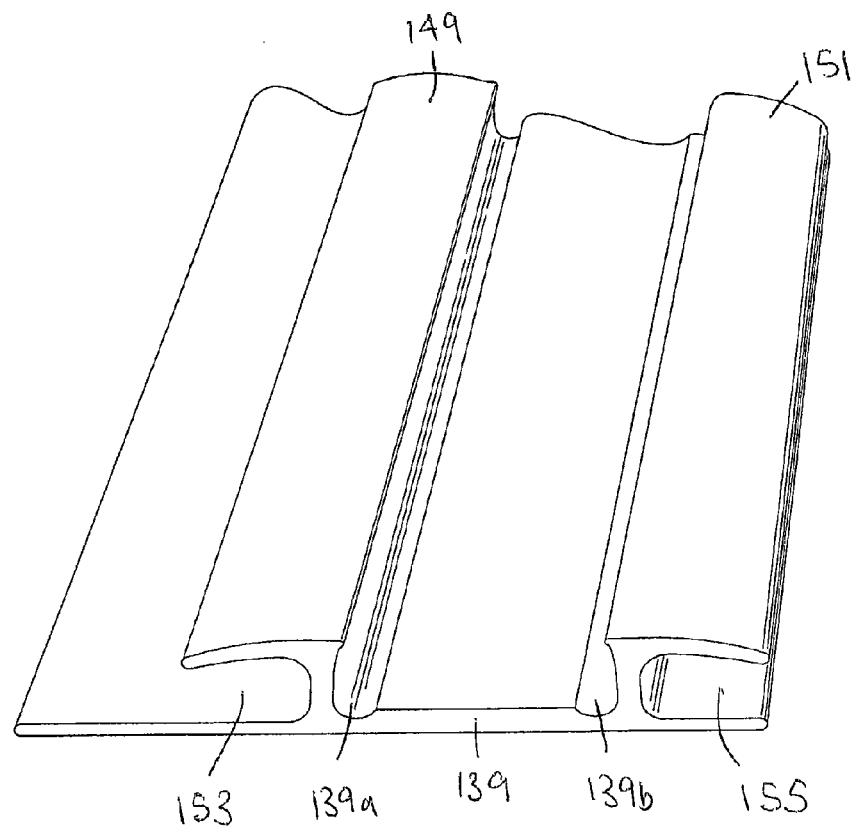
FIG. 9 is a perspective view of the holder of FIG. 6 from one end.
Figure 10:
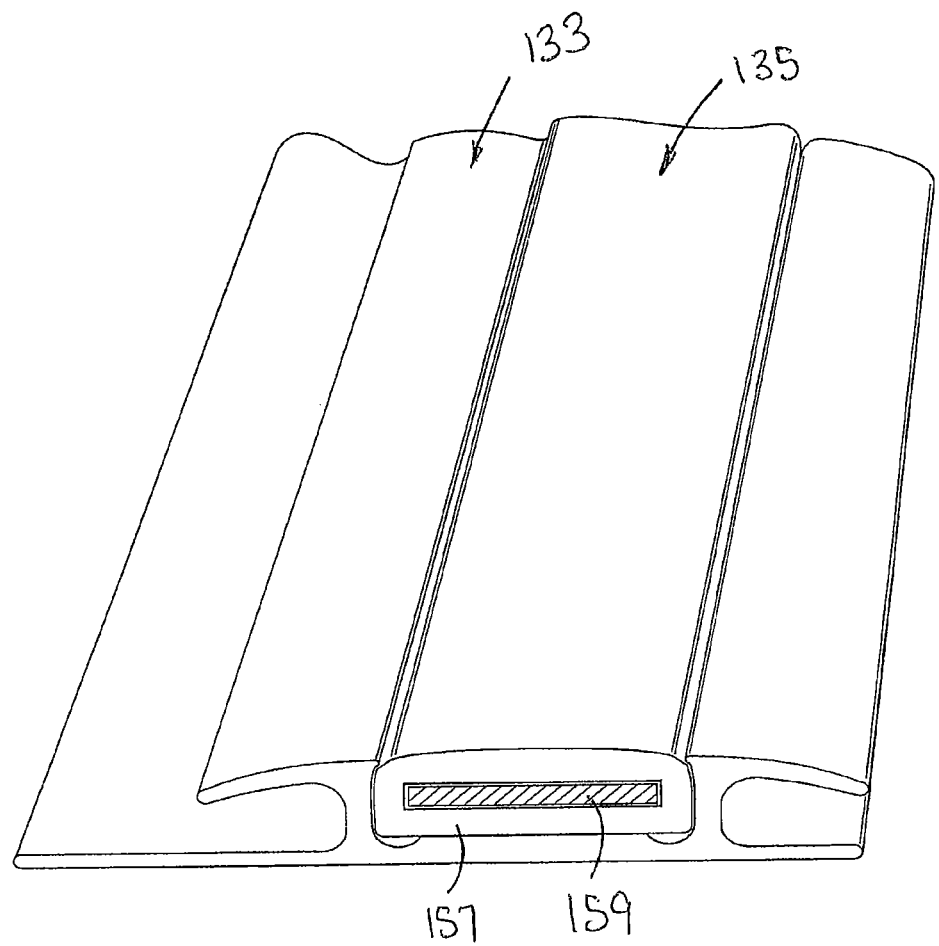
FIG. 10 is a perspective view of the holder and insert of FIG. 7 from one end.
Figure 11:
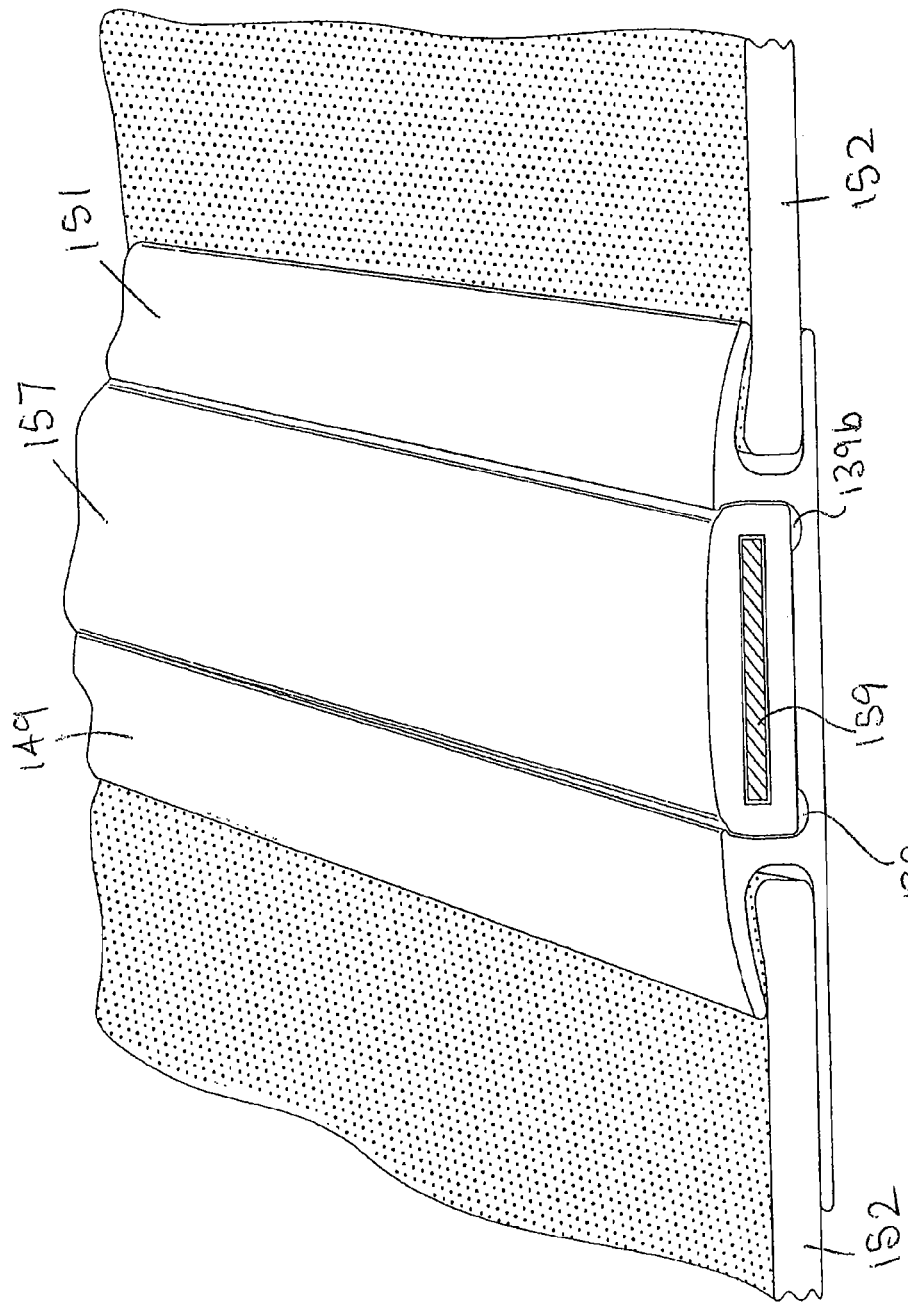
FIG. 11 is a perspective view of the holder, insert and floor covering of FIG. 8 from one end.

Secondly, the flanges 149,151 rotate as the sidewalls 137, 139 pivot so that the outer free edge 149a,151a of the flanges 149,151 moves towards the base wall 139 to reduce the size of the opening at the mouth of the grooves 153,155 and to grip and retain positively the cut edge of the carpet 152 or other floor covering inserted in the grooves 153,155 as shown by the arrows in FIG. 8. This also enables different thicknesses of floor coverings to be located and secured in the grooves 153,155 enabling the same holder to be used with a range of floor coverings. In a modification (not shown), the grooves 153,155 may be provided with formations on one or both opposed internal faces that assist retention of the floor covering in the grooves 153,155, for example one or more longitudinally extending ribs.

Thirdly, the grooves 139a,139b in the base wall 139 assist flexing of the sidewalls 141,143 and stop or inhibit the formation of stress cracks in the plastics material of the holder where the sidewalls 141,143 pivot relative to the base wall 139. The grooves 139a,139b also collect any liquids, fluids that are spilt on the track and penetrate into the channel 137 thereby keeping the liquid or fluid away from the insert 135 while it evaporates and stopping the liquid or fluid coming into contact with the insert and potentially causing stress cracking of the plastics material of the insert 135.

Another modification of the holder 133 is the asymmetric configuration of the base wall 139 so that, on one side of the holder 133, the base wall 139 extends laterally beyond the edge of the flange 149 and, on the other side of the holder 133, the base wall 139 is slightly narrower and inset from the edge of the flange 151. In this way, the flange 151 can be butted up against a wall or other surface allowing the track to be installed close to the wall without the need to fit a small strip of floor covering to conceal the base wall 139 or remove part of the base wall 139 before installation, for example, when fitting the track at the lateral sides of a stairway. It will be appreciated that the base wall 139 could be slightly narrower and inset from the edge of the flanges on both sides of the holder 133.

In other respects, the construction, installation and use of the track to provide emergency lighting is similar to and will be understood from the description of the previous embodiments.

In the above-described embodiments, the emergency lighting is employed in an aircraft. It will be understood, however that the emergency lighting may have application to other vehicles such as trains, ships, coaches. Moreover, the emergency lighting may also be suitable for use in buildings to guide occupants to an exit. The invention also has application to situations where the emergency lighting is provided to assist movement up or down stairs forming part of an escape route. For example, the photoluminescent track may be provided to indicate the position of individual steps and/or the inclination (steepness) of the stairway. Thus, the photoluminescent track may be provided at the lateral edges of the steps on the treads and/or risers to indicate the position of each step when moving up or down the stairs. Alternatively or additionally, a continuous length of photoluminescent track may be provided on one or both sides of the stairs extending between the top of the stairs and the bottom of the stairs (or any intervening landing) to indicate where the stairs start and finish and the inclination (steepness) of the stairs.

It will be understood that the invention is not limited to the embodiments above-described and that features of any embodiment may be employed separately or in combination with any other embodiment.

I claim:

1. A photoluminescent track for an emergency lighting system comprising an elongate holder and an elongate photoluminescent insert, said holder having a top surface and a base wall including a bottom surface configured to be placed on an underlying support surface, said base wall extending lengthwise of the holder, a distance between said top surface and said bottom surface defining a vertical height of said holder, a pair of sidewalls extending lengthwise of said holder, said sidewalls being formed integrally with said base wall and defining with said base wall a channel that extends lengthwise of said holder, said channel having a mouth defining an opening in said top surface of said holder that is uppermost in use of the track wherein said insert is received in said channel, and is releasably secured in said channel between said sidewalls such that an upper surface of said insert is exposed within said opening, and wherein at least one of said sidewalls is inset from a side edge of said base wall, extends along said vertical height of said holder and terminates at said top surface of said holder in an outwardly directed flange that extends lengthwise of said holder, said flange being formed integrally with said inset sidewall, flange and said base wall extending outwardly from said inset sidewall and defining with said inset sidewall, a groove that extends lengthwise of said holder, said groove having a mouth defining an opening along a side of said holder.

2. The photoluminescent track according to claim 1 wherein said sidewalls of said channel terminate at said mouth in lips that extend inwardly of said opening and co-operate with edge portions of said insert to retain said insert in said channel.

3. The photoluminescent track according to claim 2 wherein said lips engage rebated edge portions of said insert such that said uppermost surface of said holder is substantially contiguous with an uppermost surface of said insert.

4. The photoluminescent track according to claim 1 wherein both said sidewalls are inset from side edges of said base wall and provided at upper edges thereof with outwardly directed flanges extending lengthwise of said holder, said flanges being formed integrally with said sidewalls and being spaced above said base wall where said sidewalls are inset from said side edges of said base wall, said flanges, sidewalls and base wall defining grooves extending lengthwise of said holder, said grooves having a mouth defining openings in side edges of said holder.

5. The photoluminescent track according to claim 4 wherein said base wall extends laterally beyond said flange on one side of said channel.

6. The photoluminescent track according to claim 1 wherein said sidewalls of said channel converge from said base wall towards said mouth of said channel prior to insertion of said insert.

7. The photoluminescent track according to claim 1 wherein said base wall of the holder is provided with grooves within said channel that extend lengthwise of said holder adjacent said sidewalls of said channel.

8. The photoluminescent track according to claim 1 wherein said insert is reversible and can be fitted either way up in said channel.

9. The photoluminescent track according to claim 1 wherein said holder and insert match the color of the adjacent floor covering.

10. An emergency lighting system comprising a photoluminescent track according to claim 1 arranged to identify an escape route.

11. The emergency lighting system according to claim 10 wherein said escape route is defined between a pair of photoluminescent tracks.

12. The emergency lighting system according to claim 10 wherein said escape route includes a stairway.

13. The emergency lighting system according to claim 10 wherein said escape route is provided in a passenger vehicle selected from the group comprising an aircraft, train, coach and ship.

14. A photoluminescent track for an emergency lighting system consisting of:
    an elongate holder including a top surface and a bottom wall having a bottom surface configured to be placed on an underlying support surface, said holder having a channel extending lengthwise of said holder, wherein a vertical height of said holder is defined by a distance between said top surface and said bottom surface; and
    a separate elongate photoluminescent insert, said channel defining an opening in an upper surface of said holder that is uppermost in use of said track in which said insert is received and releasably secured between opposing sidewalls of said channel, and said holder including at least one sidewall and a flange, said at least one sidewall extending along said vertical height of said holder, wherein said flange and said base wall extend outwardly from said at least one sidewall, and said flange, said base wall and said at least one sidewall defining a groove extending along an entire length of said sidewall and on at least one side edge of said holder for receiving a marginal edge of a floor covering, wherein said holder is formed integrally with said channel and said groove.

15. A photoluminescent track for an emergency lighting system consisting of:
    an elongate holder having a top surface, a base wall with a bottom surface configured to be placed on an underlying support surface and an integrally formed channel extending lengthwise of said holder, wherein a distance between said top surface and said bottom surface defines an entire vertical height of said holder, said channel opening to an upper surface of said holder and inset from side edges of said holder, and said holder including a pair of sidewalls, each of said pair of sidewalls extending along said entire vertical height of said holder, said holder including a flange, wherein said flange and said base wall of said holder extend outwardly from each of said pair of sidewalls, each said flange, said base wall and said sidewall defining an integrally formed groove extending along said sidewall and extending lengthwise of said holder, said grooves opening to said side edges of said holder;

a photoluminescent insert having an elongate light transmitting casing and an elongate photoluminescent member housed within said casing, said casing being received in said channel and releasably secured between opposing sidewalls of said channel so that an upper surface of said insert is exposed for direct transmission of light through said casing; and a base wall of said channel is provided with grooves extending lengthwise of said channel adjacent to said sidewalls for collecting any liquid that penetrates into said channel.

* * * * *